3,225,070
POLYCYCLIC COMPOUNDS
Hsing Yun Fan, Modesto, Calif., assignor to Shell Oil
Company, New York, N.Y., a corporation of Delaware
No Drawing. Filed Dec. 28, 1961, Ser. No. 162,965
8 Claims. (Cl. 260—348)

This application is a continuation-in-part of copending application Ser. No. 46,371, filed Aug. 1, 1960, now abandoned.

This invention pertains to novel polycyclic monoepoxides, more particularly described as polyhydronaphthalene diones containing an epoxide ring involving the carbon atoms which also are involved in the fusion of the two carbon rings of the polyhydronaphthalene structure. The novel compounds of this invention thus have the essential character represented by the structural formula:

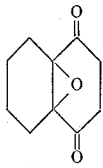

(I)

In terms of name, these compounds can be designated as 4a,8a-epoxy-polyhydronaphthalene-5,8-diones. Included in this general class of epoxides are those wherein a methano bridge joins the carbon atoms in the 1- and 4-positions. These, of course, are the 4a,8a-epoxy-polyhydro-1,4-methanonaphthalene-5,8-diones.

Described more particularly, the compounds of this invention are characterized by the structural formula:

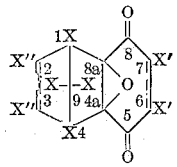

II wherein each X, X', and X" is individually selected from the group consisting of hydrogen, middle halogen (i.e., bromine and chlorine), and low molecular weight organic. The broken lines in the formula indicate the fact that this class of novel compounds includes those having a methano bridge between the carbon atoms in the number 1- and 4-positions, as well as those having no such bridge, and those compounds having an ethylenic or double bond between the carbon atoms in the number 2- and 3-positions, and/or between the carbon atoms in the number 6- and 7-positions, as well as those which have saturated or single bonds between those same two pairs of carbon atoms.

The organic groups represented by the symbols X, X', and X", respectively, preferably are low molecular weight hydrocarbon or substituted hydrocarbon—i.e., groups containing not more than about 10 carbon atoms each—and the compounds of greatest interest are those wherein each of the organic groups represented by these symbols are hydrocarbon groups. Such hydrocarbon groups may be of either aliphatic or cyclic configuration; they may be saturated, olefinically unsaturated, or aromatically unsaturated; preferably they are free from acetylenic unsaturation. The aliphatic groups may be of straight-chain or of branched-chain configuration. The aromatic groups preferably are mononuclear. Thus, suitable organic groups include both straight-chain and branched-chain alkyl such as methyl, ethyl, n- and isopropyl, n-, sec- and ter-butyl, the various $C_5$, $C_6$ and like alkyl groups, cycloalkyl such as the cyclopentyl, cyclohexyl, methylcyclohexyl, dimethylcyclooctyl, 5,5,5-trimethylcyclohexyl, and like cycloalkyl groups, aryl such as the phenyl group, alkaryl such as the methylphenyl, ethylphenyl, and like alkaryl groups, aralkyl such as the benzyl, phenethyl and like aralkyl groups, alkenyl such as the allyl, crotyl and like groups, alkadienyl such as the butadienyl, pentadienyl and like alkadienyl groups, and mixed groups such as the vinylphenyl, allylphenyl, phenylvinyl, phenylcrotyl, phenylallyl groups, and the like. Of the substituted hydrocarbon groups, those hydrocarbon groups set out above which are substituted by one or more of halogen, cyano and nitro are preferred. Because of their properties, the compounds wherein the organic groups represented by the symbols X, X' and X" are alkyl of from 1 to 6 carbon atoms are preferred.

Of these compounds, the subclass wherein there is a 1,4-methano bridge and at least one of X' is middle halogen, preferably chlorine, are of particular interest because of their high toxicity toward microorganisms. In terms of name, these preferred compounds can be designated as 4a, 8a-epoxy-polyhydro-1,4-methanonaphthalene-5,8-diones containing halogen on at least one of the carbon atoms at the 6- and 7-positions. From the available data, it appears that the 6,7-di(middle halo) compounds of this subclass have the highest toxicity toward microorganisms.

Since starting materials for their preparation are at present most readily available and the resulting compounds exhibit high activity toward microorganisms, the compounds of this class wherein all of X and X" are hydrogen or halogen (preferably chlorine) are preferable.

Those compounds of this invention in which a 1,4-methano bridge is present can exist in the form of two stereoisomers, of two general types: one in which the epoxy ring and the methano bridge are in cis configuration, and one in which the epoxy ring and the methano bridge are intrans configuration; that is, if the carbon atoms of the cyclohexane ring are considered to lie in the same plane, neither the methano bridge nor the epoxy ring lie in that plane, and both can lie on the same side of that plane, or each can lie on opposite sides of that plane, respectively. The character of the stereoisomers which can exist in compounds containing a bicycloheptane structure is shown in U.S. Patent No. 2,717,851. (As used herein, the term "stereoisomer" designates only the geometric isomers whose spatial configuration differs, and does not include optical isomers-isomer pairs which exist because one is the mirror image of the other.) In this specification, the usual exo-endo terminology employed with bridged ring systems will be used: the epoxy ring being designated as exo when it is on the same side of the cyclohexane ring as the methano bridge and being designated as endo when it is on the opposite side of the cyclohexane ring from the methano bridge.

Specific examples of compounds within the scope of this invention include the following among others:

1,2,3,4,6,7,9,9-octachloro-exo-4a,8a-epoxy-1,4,4a,8a-tetrahydro-endo-1,4-methanonaphthalene-5,8-dione;
1,2,3,4,6,7,9,9-octachloro-endo-4a,8a-epoxy-1,4,4a,8a-tetrahydro-exo-1,4-methanonaphthalene-5,8-dione;
1,2,3,4,6,7,9,9-octabromo-exo-4a,8a-epoxy-1,4,4a,8a-tetrahydro-endo-1,4-methanonaphthalene-5,7-dione;
1,2,3,6,7,9,9-heptachloro-exo-4a,8a-epoxy-1,4,4a,8a-tetrahydro-endo-1,4-methanonaphthalene-5,8-dione;
1,2,4,6,7,9,9-heptachloro-endo-4a,8a-epoxy-1,4,4a-8a-tetrahydro-exo-1,4-methanonaphthalene-5,8-dione;
1,2,3,4-tetrabromo-6,7-dichloro-exo-4a,8a-epoxy-1,4,4a,8a-tetrahydro-endo-1,4-methanonaphthalene-5,8-dione;
1,2,3,4,6,7-hexachloro-endo-4a,8a-epoxy-1,4,4a,8a-tetrahydro-exo-1,4-methanonaphthalene-5,8-dione;
6,7-dichloro-exo-4a,8a-epoxy-1,4,4a,8a-tetrahydro-endo-1,4-methanonaphthalene-5,8-dione;

6,7-dibromo-exo-4a,8a-epoxy-1,2,3,4,4a,8a-hexahydro-endo-1,4-methanonaphthalene-5,8-dione;
2,6,7-trichloro-endo-4a,8a-epoxy-1,4,4a,8a-tetrahydro-exo-1,4-methanonaphthalene-5,8-dione;
1,4,6,7,9,9-hexachloro-endo-4a,8a-epoxy-1,4,4a,8a-tetrahydro-exo-1,4-methanonaphthalene-5,8-dione;
1,2,3,4,6,9,9-heptachloro-exo-4a,8a-epoxy-1,4,4a,8a-tetrahydro-endo-1,4-methanonaphthalene-5,8-dione;
1,2,3,7,8,9-hexachloro-exo-4a,8a-epoxy-1,4,4a,8a-tetrahydro-endo-1,4-methanonaphthalene-5,8-dione;
1,2,4,6,9,9-hexachloro-exo-4a,8a-epoxy-1,4,4a,8a-tetrahydro-endo-1,4-methanonaphthalene-5,8-dione;
1,4,7,9,9-pentachloro-endo-4a,8a-epoxy-1,4,4a,8a-tetrahydro-exo-1,4-methanonaphthalene-5,8-dione;
1,4,6,7,9,9-hexachloro-endo-4a,8a-epoxy-1,2,3,4,4a,8a-hexahydro-exo-1,4-methanonaphthalene-5,8-dione;
1,4,6,7,9,9-hexabromo-endo-4a,8a-epoxy-1,4,4a,8a-tetrahydro-exo-1,4-methanonaphthalene-5,8-dione;
1,2,3,4,6,7,9-heptachloro-endo-4a,8a-epoxy-1,4,4a,8a-tetrahydro-exo-1,4-methanonaphthalene-5,8-dione;
4a,8a-epoxydecalin-5,8-dione;
exo-4a,8a-epoxy-endo-1,4-methanodecalin-5,8-dione;
endo-4a,8a-epoxy-1,4-methanodecalin-5,8-dione;
6,7-dichloro-4a,8a-epoxy-1,2,3,4,4a,8a-hexahydronaphthalene-5,8-dione;
6,7-dichloro-4a,8a-epoxy-1,4a,8a-tetrahydronaphthalene-5,8-dione;
6-chloro-4a,8a-epoxy-1,4,4a,6,7,8a-hexahydronaphthalene-5,8-dione;
7-chloro-exo-4a,8a-epoxy-1,4,4a,8a-tetrahydro-endo-1,4-methanonaphthalene-5,8-dione;
6,7-dichloro-endo-4a,8a-epoxy-1,4,4a,6,7,8a-hexahydro-exo-1,4-methanonaphthalene-5,8-dione;
7-methyl-endo-4a,8a-epoxy-1,4,4a,6,7,8a-hexahydro-exo-1,4-methanonaphthalene-5,8-dione;
2-methyl-exo-4a,8a-epoxy-1,2,3,4,4a,6,7,8a-octahydro-endo-1,4-methanonaphthalene-5,8-dione;
6-chloro-7-methyl-exo-4a,8a-epoxy-1,4,4a,8a-tetrahydro-endo-1,4-methanonaphthalene-5,8-dione;
6-chloro-7-methyl-endo-4a,8a-epoxy-1,4,4a,8a-tetrahydro-exo-1,4-methanonaphthalene-5,8-dione;
2-methyl-6,7-dichloro-endo-4a,8a-epoxy-1,4,4a,8a-tetrahydro-exo-1,4-methanonaphthalene-5,8-dione;
2-methyl-6,7-dichloro-exo-4a,8a-epoxy-1,4,4a,8a-tetrahydro-endo-1,4-methanonaphthalene-5,8-dione;
6-chloro-7-methyl-4a,8a-epoxy-1,4,4a,8a-tetrahydronaphthalene-5,8-dione;
2-methyl-6,7-dichloro-4a,8a-epoxy-1,4,4a,8a-tetrahydronaphthalene-5,8-dione;
6,7-dichloro-4a,8a-epoxy-1,2,3,4,4a,8a-hexahydro-1,4-methanonaphthalene-5,8-dione;

The novel compound of this invention may be prepared in general by a diversity of means. While the present invention should in no sense be limited by any particular means, it is preferred to prepare these novel compounds by the epoxidation of a compound identical to the desired product except for the presence of an ethylene double bond between the 4a and 8a carbon atoms instead of the epoxy ring of the desired product. The epoxidation reaction can readily be accomplished with these compounds by standard procedures for this reaction. It has been found that hydrogen peroxide in the presence of sodium carbonate is a very suitable epoxidizing agent for the preparation of the compounds of this invention, especially when the reaction is carried out at about room temperature or below. However, hydrogen peroxide in the presence of any water-soluble, alkaline materials may generally be used. Examples of such alkaline materials that may be used are sodium hydroxide, ammonium carbonate, sodium bicarbonate, and ammonia.

To further illustrate the process of this invention and the appropriate starting materials to be used, the most preferred compounds of this invention will be taken as typical examples. Thus, a polychloro - 4a,8a - epoxy - 1,2,3,4,4a,8a - hexahydro - 1,4 - methanonaphthalene -5, 8-dione wherein a chlorine atom is substituted on at least one of the ethylenically bonded carbon atoms alpha to a carbonyl group may be prepared by epoxidizing a polychloro - 1,2,3,4 - tetrahydro - 1,4 - methanonaphthalene - 5,8-dione, wherein a chlorine atom is substituted on at least one of the ethylenically bonded carbon atoms alpha to a carbonyl group, with hydrogen peroxide in the presence of sodium carbonate. Similarly, a polychloro - 4a, 8a - epoxy - 1,4,4a,8a - tetrahydro - 1,4 - methanonaphthalene-5,8-dione wherein a chlorine atom is substituted on at least one of the ethylenically bonded carbon atoms alpha to a carbonyl group, may be prepared by epoxidizing a polychloro - 1,4 - dihydro - 1,4 - methanonaphthalene-5,8-dione, wherein a chlorine atom is substituted on at least one of the ethylenically bonded carbon atoms alpha to a carbonyl group, with hydrogen peroxide in the presence of sodium carbonate.

Details of the method of preparation are best described by reference to the following examples. These examples are offered for illustrative purposes only and are not to be construed as limiting the invention in any way.

EXAMPLE I

*Preparation of 2,6,7,9-tetrachloro-4a,8a-epoxy-1,2,3,4,4a, 8a-hexahydro-1,4-methanonaphthalene-5,8-dione*

A solution of 3 grams of sodium carbonate, 15 ml. of water, and 30 ml. of 30% $H_2O_2$ was added portionwise to a suspension of 31.2 grams of 2,6,7,9-tetrachloro-1,2,3, 4-tetrahydro-1,4-methanonaphthalene-5,8-dione in 50 ml. of 1,2-dimethoxyethane. The temperature was kept between 5–15° C. with a Dry Ice bat. The addition of the epoxidizing mixture was completed in about 5 minutes. The reaction mixture was then allowed to rise to room temperature while being stirred. After 45 minutes, the reaction mixture was diluted with 100 ml. of water and filtered to obtain a light yellow precipitate which on washing with 160 ml. of methyl alcohol, gave a nearly colorless material with a melting point of 198–200° C. The material weighed 19.2 grams for a calculated yield of 63%. The product was purified by recrystallization from ethyl acetate to give off-white material, M.P. 204–205° C.

| | C | H | Cl |
|---|---|---|---|
| Analysis for $C_{11}H_6O_3Cl_4$: | | | |
| Calculated | 40.3 | 1.8 | 43.3 |
| Found | 40.2 | 2.2 | 43.0 |

EXAMPLE II

*Preparation of 2,3,6,7-tetrachloro-4a,8a-epoxy-1,2,3,4,4a, 8a-hexahydro-1,4-methanonaphthalene-5,8-dione*

A solution of 3 grams of sodium carbonate in 15 ml. of water and 30 ml. of 30% $H_2O_2$ was added portionwise over a period of 5 minutes with vigorous stirring to a solution of 31.2 grams of 2,3,6,7-tetrachloro-1,2,3,4-tetrahydro-1,4-methanonaphthalene-5,8-dione in 500 ml. of 1, 2-dimethoxyethane which had been chilled to −5° C. A mild exothermicity was observed. The reaction temperature was maintained between −5 and 0° C. for 15 minutes. The reaction mixture was then diluted with approximately 400 ml. of water and filtered. The filtered material was washed with water to give 23.6 grams of product, melting at 195–197° C., for a calculated yield of 72%. The product was recrystallized from ethyl acetate to give 19 grams of slightly yellow crystalline material, M.P. 198–199° C.

| | C | H | Cl |
|---|---|---|---|
| Analysis for $C_{11}H_6O_3Cl_4$: | | | |
| Calculated | 40.3 | 1.8 | 43.3 |
| Found | 40.0 | 1.9 | 42.8 |

EXAMPLE III

*Preparation of 6,7-dichloro-4a,8a-epoxy1,4,4a,8a-tetrahydro-1.4-methanonaphthalene-5,8-dione*

A solution of 3.0 grams of sodium carbonate in 16 ml. water and 30 ml. of 30% $H_2O_2$ was added in small portions with stirring to a suspension of 24 grams of 6,7-dichloro-1,4-dihydro-1,4-methanonaphthalene-5,8-dione in 120 ml. of 1,2-dimethoxyethane over a period of 5 minutes. The reaction temperature was kept between —10 and 0° C. for the first half hour, then allowed to rise to room temperature during the next half hour. The reaction mixture was stirred for 45 minutes more and then diluted with water. The suspension was then filtered and washed with water to obtain 11.0 grams of product, melting point 112–116° C. Recrystallization from ethyl acetate yielded 9.0 grams of light yellow material melting at 116.5–117.5° C.

|  | C | H | Cl |
|---|---|---|---|
| Analysis for $C_{11}H_6O_3Cl_2$: |  |  |  |
| Calculated | 51.3 | 2.3 | 27.6 |
| Found | 51.0 | 2.5 | 27.3 |

Infrared analysis indicated that the epoxy group was jointed to the 4a,8a-positions of the carbon skeleton.

EXAMPLE IV

*Preparation of 1,2,3,4,6,7,9,9-octachloro-4a,8a-epoxy-1,4, 4a,8a-tetrahydro-1,4-methanonaphthalene-5,8-dione*

A solution of 1 gram of sodium carbonate, 5 ml. of water, and 10 ml. of 30% $H_2O_2$ was added portionwise with stirring, while the temperature was kept below 0° C., to a chilled solution of 16 grams of 1,2,3,4,6,7,9,9-octachloro-1,4-dihydro-1,4-methanonaphthalene5,8-dione in 40 ml. of 1,2-dimethoxyethane. The reaction was allowed to continue for a total period of 10 minutes. A dark purple solution was obtained which was diluted with 200 ml. of water and filtered. A portion of the material was accidentally lost at this point. The residue appeared gummy and was triturated with methyl alcohol and filtered to give 7 grams of product. This product was dissolved and decolorized in hot methyl alcohol and then evaporated to a smaller volume to give 1.65 grams of material, M.P. 162–163° C.

|  | C | H | Cl |
|---|---|---|---|
| Analysis for $C_{11}O_3Cl_8$: |  |  |  |
| Calculated | 28.4 | 0.0 | 61.3 |
| Found | 28.1 | 0.0 | 61.0 |

EXAMPLE V

*Preparation of 6,7-dichloro-4a,8a-epoxy-1,4,4a,8a-tetrahydro-1,4-methanonaphthalene-5,8-dione and identification of the stereoisomeric forms thereof*

A solution of 20 grams of sodium carbonate in 100 milliliters of water and 200 milliliters of 30% hydrogen peroxide was added portionwise with stirring to a suspension of 160 grams of 6,7-dichloro-1,4-dihydro-1,4-methanonaphthalene-5,8-dione in 800 milliliters of 1,2-dimethoxyethane at 0–10° C. The mixture was maintained at that temperature for a total of 1.5 hours. The mixture then was filtered and washed with a 2:1 mixture of 1,2-dimethoxyethane and water to give 37 grams of a product melting at 116–117° C. The filtrate was diluted with 1500 milliliters of water and the precipitated solid was filtered and washed with a 2:1 mixture of 1,2-dimethoxyethane and water to give an additional 28 grams of product melting at 111–115° C. Recrystallization of these products from ethyl acetate gave the pure compound melting at 117–118° C. which was identified as 6,7-dichloro-exo-4a,8a-epoxy-1,4,4a,8a-tetrahydro - endo - 1,4-methanonaphthalene-5,8-dione as follows. The elemental analysis and infrared spectrum was essentially that set out for the calculated product of Example III.

The final filtrate contained a heavy oily layer from which some crystalline material separated on standing. The aqueous solution was decanted and the oil was triturated with methanol to give another 3.2 grams of the endo-epoxy isomer, M.P. 115–117° C. The methanolic filtrate was concentrated to give 1.7 grams of a product which upon recrystallization from ethyl acetate gave 0.8 gram of a material melting at 153–155° C., and identified as 6,7 - dichloro - 4a,8a-epoxy-1,4-4a,8a-tetrahydro-1,4-methanonaphthalen-5,8-dione by elemental and infrared analysis.

|  | C | H | Cl |
|---|---|---|---|
| Analysis for $C_{11}H_6Cl_2O_3$: |  |  |  |
| Calculated | 51.3 | 2.3 | 27.6 |
| Found | 51.4 | 2.2 | 27.6 |

The infrared analysis showed that the epoxy group in this isomer of M.P. 153–155° C. also occupied the 4a, 8a-positions. Since the only difference that is possible between the two isomers involves the geometry about the 4a,8a-positions and in the isomer of M.P. 117–118° C. the orientation of the 4a,8a-epoxy group is exo, the corresponding epoxy group of the isomer of M.P. 153–155° C. must then be endo.

EXAMPLE VI

*Preparation of 6,7-dichloro-4a,8a-epoxy-1,2,3,4,4a,8a-hexahydro-1,4-methanonapthalene-5,8-dione*

A solution of 6.37 grams of sodium carbonate in 34 ml. of water and 42.5 ml. of 90% $H_2O_2$ was added portionwise with stirring to a solution of 31.6 grams (0.13 mole) of 6,7-dichloro-1,2,3,4-tetrahydro-1,4-methanonaphthalene-5,8-dione in 212 ml. of 1,2-dimethoxyethane over a period of 1.25 hours at 0 to 10° C. and the mixture was stirred at this temperature for an additional two hours. The reaction mixture was then allowed to rise to room temperature. After stirring for 23.5 hours, a solution of 3 grams of sodium carbonate in 15 ml. of water was added in 6 hours. The reaction mixture was then diluted with 1.5 liters of water to give a precipitate which was filtered and recrystallized from ethyl acetate to yield 6 grams of 6,7-dichloro-4a,8a-epoxy-1,2,3,4,4a,8a-hexahydro-1,4 - methanonaphthalene - 5,8-dione, M.P. 138–140° C.

|  | C | H | Cl |
|---|---|---|---|
| Analysis for $C_{11}H_8O_3Cl_2$: |  |  |  |
| Calculated | 51.0 | 3.1 | 27.4 |
| Found | 51.3 | 3.4 | 27.6 |

EXAMPLE VII

*Preparation of 6,7-dichloro-4a,8a-epoxy-1,2,3,4,4a,8a-hexahydro-1,4-methanonaphthalene-5,8-dione*

To a solution of 43.5 grams of 6,7-dichloro-4a,8a-epoxy - 1,4,4a,8a - tetrahydro-1,4 - methanonaphthalene-5,8-dione in 261 ml. dioxane, 0.218 gram of platinum oxide was added and the mixture was hydrogenated in a Paar bomb at an initial pressure of 40 p.s.i. In about 45 minutes, 0.169 mole of hydrogen was consumed. The reaction mixture was then filtered to remove the catalyst. The filtrate was evaporated to dryness and the residue was triturated with methanol to give 28.4 grams of colorless crystalline material, M.P. 142–142.5° C., having an infrared absorption spectrum identical with the product of Example VI.

6,7 - dichloro - 4a,8a - epoxy 1,2,3,4,4a,8a - hexahydro-1,4-methanonaphthalene-5,8-dione was found to be a highly active fungicide. Field tests indicate that this fungicide has a residual action against potato late blight.

Laboratory data indicate that it is active against nine foliage pathogens.

The starting materials for the present invention having an ethylenic double bond between the 4a and 8a carbon atoms may in general be prepared by the following route:

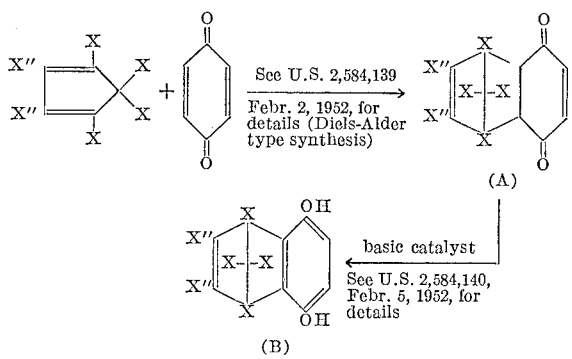

In the above equations each X and X" has the respective meaning already set forth herein.

The corresponding starting dione material having a double bond between carbon atoms 4a and 8a is then obtained by chlorinating or brominating the product (B), depending upon whether chlorine or bromine is desired as the substituent on the number 6 and 7 carbon atoms. The following example employing chlorine and a product (B) in which each X and X" is chlorine will be used to illustrate the details of this step.

EXAMPLE VIII

*Preparation of 1,2,3,4,6,7,9,9-octachloro-1,4-dihydro-1,4-methanonaphthalene-5,8-dione*

A stream of 59 grams of chlorine, over a period of 1 hour, was passed through a refluxing solution of 49 grams of 1,2,3,4,9,9-hexachloro - 1,4 - dihydro - 1,4 - methanonaphthalene-5,8-diol in 290 ml. of acetic acid. The reaction mixture was diluted with water to give a gummy precipitate which was recrystallized from hexane twice to give 12 grams of the desired compound, M.P. 163–164° C. Chlorine analysis for 1,2,3,4,6,7,9,9-octachloro-1,4-dihydro-1,4 - methanonaphthalene - 5,8-dione: Calculated, 63.4; found, 63.0.

An alternative general method for preparation of the starting materials of the process of this invention is described in J. Am. Chem. Soc., 76, 6150 (1954) and may be depicted as follows:

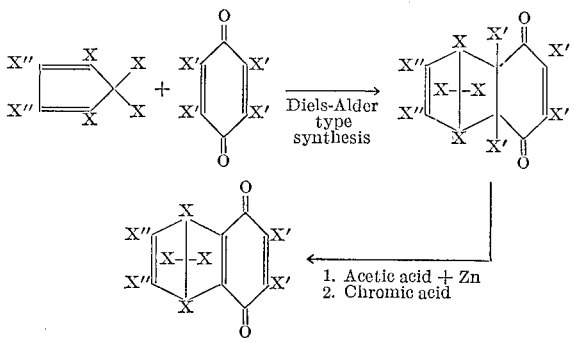

Each X, X' and X" has the respective meaning already set out herein. It will be appreciated that starting materials for the preparation of compounds within the scope of this invention, wherein at least one X' is a chlorine or bromine atom, require that the appropriate reactants generally shown be selected. In addition, it is to be noted that this method may not be suitable where all of the X's are chlorine.

Starting materials for preparation of desired compounds of this invention in which the bridged ring is saturated, may be prepared from the starting materials described in the preceding paragraph. This may be accomplished by hydrogenation of those compounds in which the bridged ring is unsaturated between the number 2 and 3 carbon atoms. For example, 6,7-dichloro - 1,4 - dihydro-1,4-methanonaphthalene-5,8-dione may be hydrogenated to produce 6,7-dichloro-1,2,3,4 - tetrahydro - 1,4 - methanonaphthalene-5,8-dione.

Additional alternative methods for preparing the starting materials are taught in U.S. 2,886,577, May 12, 1959, where compounds of the structure shown are prepared:

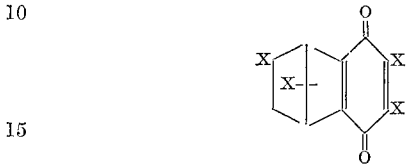

where X represents a chlorine or bromine atom.

Another sequence of steps that may be used to prepare a particular starting material is as follows, and is taught in U.S. Patent application Serial No. 828,733, filed July 22, 1959.

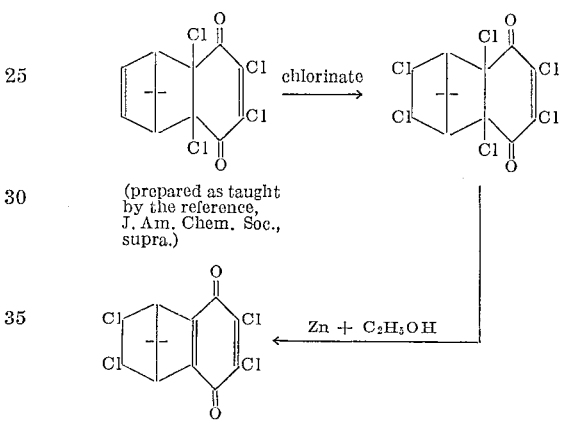

This method is equally applicable to the bromine and other analogs.

It is to be understood that in the foregoing reactions, an acyclic diene, e.g., 1,3-butadiene and isoprene, may be used instead of the cyclic diene, the product being the corresponding polyhydronaphthalene compound containing no methano bridge. Thus, compounds of the invention containing no methano bridge can be prepared in this manner.

The compounds of the present invention possess fungicidal activity to a wide variety of plant pathogens. In the foliage fungicide screen, three varieties of bean plants, which are hosts for four foliage fungus diseases, were employed. These hosts and pathogens are listed below. The chemicals were screened for general as well as specific test control activity and for phytotoxicity. Diseases and hosts are shown below:

| Bean Hosts | Pathogens |
| --- | --- |
| *Phaseolus vulgaris* var. Pinto | *Uromyces phaseoli* var. typical (rust). |
| *Phaseolus vulgaris* var. Black Valentine. | *Erysiphe polygoni* (podery mildew). |
| *Phaseolus lunatus* var. Fordhook 242. | *Colletotrichum lindemuthianum* (anthracnose). *Phytophthora phaseoli* (downy mildew). |

These four bean pathogens are of economic importance and represent each of four classes of fungi. *Phytophthora phaseoli* is closely allied with *Phytophthora infestans*, the important potato and tomato pathogen.

The test was carried out according to the following procedure: The test chemicals were prepared as 1% w./v. stock solutions in a solvent. The stock was diluted for spraying, using a diluent consisting of distilled water plus solvent (1:1) or diluent consisting of distilled water plus two co-solvents (2:1:1). Triton X-155, at 0.005-0.10% w., was used as a wetting agent for each concentration of toxicant. All chemicals were initially tested at a single concentration of 1000 p.p.m. Disease control being shown, the chemicals were retested at 1000 p.p.m., and the next lowest dilution of 500 p.p.m. The chemicals were then retested in this fashion until the minimum effective concentration was determined. Phytotoxicity assessments were expressed as the maximum "safe" concentration.

Spray applications were made using a laboratory sprayer. The bean plants were selected for use at a stage when the two primary leaves were about three-quarters expanded. To facilitate deposit, the primary leaves were oriented to a vertical position by pinning them to a small wire staff. Either the upper or lower epidermis of the leaf was exposed to the spray stream, depending on the surface to be inoculated.

With the mist-type spray and the diluent mixture which is applied, a drying interval of one to two hours was sufficient before inoculation with spore suspensions using a specially constructed atomizer. Inoculations with bean mildew were made by dusting conidia over treated plants in the greenhouse.

After 24 hours' incubation at 19° C. and 100% humidity, the plants were removed to the controlled environment greenhouse for symptom development. Disease control and phytotoxicity assessments were made within seven days. Of the greatest significance is the fact that compounds of the present invention are outstanding fungicides yet do not manifest significant phytotoxicity.

The following table summarizes the results of screening:

TABLE II

| | Minimum Effective Concentration (p.p.m.) | | | |
|---|---|---|---|---|
| | Bacteria | | Fungi | |
| | BS | EC | PI | VA |
| 2,6,7,9-tetrachloro-4a,8a-epoxy-1,2,3,4,4a,8a-hexahydro-1,4-methanonaphthalene-5,8-dione | 10–20 | 10–20 | 20–40 | 10–20 |
| 2,3,6,7-tetrachloro-4a,8a-epoxy-1,2,3,4,4a,8a-hexahydro-1,4-methanonaphthalene-5,8-dione | 10 | >30 | 5–10 | 6–8 |
| 6,7-dichloro-4a,8a-epoxy-1,4,4a,8a-tetrahydro-1,4-methanonaphthalene-5,8-dione | 40–80 | 40–80 | 80–100 | 80–150 |

BS—*Bacillus subtilus*, gram+bacteria.
EC—*Escherichia coli*, gram−bacteria.
PI—*Penicillium italicum*, fungi.
VA—*Verticillium alboratium*, fungi.

The active compounds of the present invention may be used alone or in combination with other fungicidal, viricidal, insecticidal or acaricidal materials, the action on which may be either internal or external, with plant nutritives, plant hormones, and the like. Wetting agents and, if necessary or desirable, stickers such as the heavy hydrocarbon oils with a minimum viscosity of 10° Engler at 50° C. can be present. The wetting agent must be nonreactive with the compounds of the present invention. Non-ionic surfactants seem preferable. If the toxic agents are employed in the form of emulsions or suspensions, for example, in water, solvents such as oils, emulsifiers, emulsion stabilizers, and the like, may be added.

TABLE I.—FOLIAGE FUNGICIDE TESTS

| | Disease Control Min. Effective Concentration (p.p.m.) | | | | Phytotoxicity Max. "Safe" Concentration (p.p.m.) | | |
|---|---|---|---|---|---|---|---|
| | P.p.[a] | E.p. | U.p. | C.l. | L.[b] | P. | B.V. |
| 2,6,7,9-tetrachloro-4a,8a-epoxy-1,2,3,4,4a,8a-hexahydro-1,4-methanonaphthalene-5,8-dione | 32–16 | 250–125 | 63–32 | 16–8 | >1,000 | >1,000 | >1,000 |
| 2,3,6,7-tetrachloro-4a,8a-epoxy-1,2,3,4,4a,8a-hexahydro-1,4-methanonaphthalene-5,8-9 dione | 63 | 125 | 63–32 | 63 | >1,000 | >1,000 | >1,000 |
| 1,7-dichloro-4a,8a-epoxy-1,4,4a,8a-tetrahydro-1,4-methanonaphthalene-5,8-dione | 1,000 | 1,000 | 1,000 | 1,000–500 | >1,000 | >1,000 | >1,000 |
| 2,3,4,6,7,9,9-octachloro-4a,8a-epoxy-1,4,4a,8a-tetrahydro-1,4-methanonaphthalene-5,8-dione | 125 | 63 | 125 | 125 | >1,000 | >1,000 | >1,000 |

[a] P.p.=*Phytophthora phaseoli* (downy mildew of lima bean).
E.p.=*Erysiphe polygoni* (bean powdery mildew).
U.p.=*Uromyces phaseoli* (bean rust).
C.l.=*Colletotrichum lindemuthianum* (bean anthracnose).
[b] L.=lima bean.
P.=pinto bean.
B.V.=black valentine bean.

The compounds of the present invention are active against a broad spectrum of microorganisms and bacteria in addition to the foliage and soil-inhabiting fungi already discussed. As a consequence of this unique activity, the compounds of the present invention may be put to medicinal uses. The following in vitro test results are offered as illustrative of the compounds of this invention when used for such purposes.

Materials which suppress phytotoxic action may also be added if desired. For example, glucose is known to protect tomato plants against damage by certain substances having a phytotoxic effect when employed in concentrated form.

The compounds of the present invention may be applied by means of spraying. Spraying of the plants to be treated may be performed with aqueous emulsions, solutions, or suspensions of the active agents. The spray liquid is generally applied at a rate of from about 75 to 150 gallons per acre. If spraying is effected with smaller quantities of liquid as in low-volume spraying, high concentrations of the active agents should be employed. If desired, a minor amount of the order of about 0.001 to about 0.05% by weight of a wetting agent may be added to aid in forming a suspension in the aqueous medium. Any of the conventional wetting agents can be employed. Particularly suitable wetting agents are the sodium salts of a mixture of secondary heptadecyl sulfates, sold commercially under the name of "Teepol" and polyethylene glycol ethers of alkyl phenols sold under the trade names of "Triton X–100" and "Triton X–155." Preferably concentrated compositions comprising an active compound of the present invention and a suitable wetting agent are prepared, and the concentrate is then dispersed in water prior to use.

A further form in which the fungicidal compounds of the present invention may be applied consists of solutions of the active ingredient in suitable inert liquid or semi-solid diluents in which the active ingredient is present in molecularly dispersed form. The form in which the agents to be employed are applied to the objects treated depends on the nature of the object and the purpose of the application.

Suitable inert solvents for the manufacture of liquid preparations should not be readily inflammable, as odorless as possible and without any toxic effect on humans and animals when properly used. Neither should they have a corrosive effect on the components of the preparations or the material of the storage vessel. Examples of suitable solvents are high-boiling oils, e.g., oils of vegetable origin, such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

The active compounds of the present invention may also be applied in the form of dusts, utilizing as the inert vehicle such materials as tricalcium phosphate, precipitated chalk, bentonite, kaolin, kieselguhr, etc.

These compounds may also be employed in the form of aerosols. For this purpose the active ingredient is dissolved or dispersed in a solvent boiling below room temperature at atmospheric pressure.

I claim as my invention:

1. The compound of the formula:

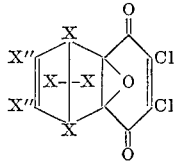

wherein X and X" each individually represents a member of the group consisting of hydrogen and middle halogen.

2. The compound of the formula:

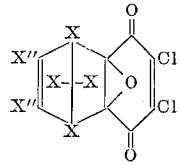

wherein X and X" each represents middle halogen.

3. 2,6,7,9-tetrachloro-4a, 8a-epoxy - 1,2,3,4,4a,8a-hexahydro-1,4-methanonaphthalene-5,8-dione.

4. 2,3,6,7-tetrachloro - 4a,8a-epoxy-1,2,3,4,4a,8a-hexahydro-1,4-methanonaphthalene-5,8-dione.

5. 1,2,3,4,6,7,9,9-octachloro - 4a,8a - epoxy-1,4,4a,8a-tetrahydro-1,4-methanonaphthalene-5,8-dione.

6. 6,7-dichloro - 4a,8a - epoxy-1,4,4a,8a-tetrahydro-1,4-methanonaphthalene-5,8-dione.

7. 6,7-dichloro - 4a,8a - epoxy-1,2,3,4,4a,8a-hexahydro-1,4-methanonaphthalene-5,8-dione.

8. The compounds of the formula:

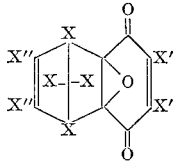

wherein each X, X', and X" is individually a middle halogen.

References Cited by the Examiner
UNITED STATES PATENTS

| | | | |
|---|---|---|---|
| 1,891,168 | 12/1932 | Luettringhaus et al. | 260—617 |
| 2,312,504 | 3/1943 | Tishler | 260—348 |
| 2,312,535 | 3/1943 | Fieser | 260—348 |
| 2,736,730 | 2/1956 | Kleiman | 260—348 |
| 2,745,848 | 5/1956 | Greenspan et al. | 260—348.5 |
| 2,802,880 | 8/1957 | Stoll et al. | 260—617 |
| 2,861,919 | 11/1958 | Gilbert | 167—33 |
| 2,899,446 | 8/1959 | Marks | 260—348.5 |
| 2,918,402 | 12/1959 | Fredrick | 167—33 |

OTHER REFERENCES

Bedos et al.: Comptes Rendus, vol. 196 (1933), pp. 625–627.

WALTER A. MODANCE, *Primary Examiner.*

IRVING MARCUS, NICHOLAS S. RIZZO, *Examiners.*